US008655610B2

(12) United States Patent
Dasgupta et al.

(10) Patent No.: US 8,655,610 B2
(45) Date of Patent: Feb. 18, 2014

(54) VIRTUAL MACHINE PLACEMENT FOR MINIMIZING TOTAL ENERGY COST IN A DATACENTER

(75) Inventors: Gargi B. Dasgupta, Gurgaon (IN); Pradipta De, Kolkata (IN); Tapan K. Nayak, New Delhi (IN); Akshat Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 12/730,505

(22) Filed: Mar. 24, 2010

(65) Prior Publication Data

US 2011/0238340 A1 Sep. 29, 2011

(51) Int. Cl.
G06F 19/00 (2011.01)
G06F 1/00 (2006.01)

(52) U.S. Cl.
USPC .......................................... 702/61; 713/320

(58) Field of Classification Search
USPC ............................................................. 702/61
See application file for complete search history.

(56) References Cited

U.S. PATENT DOCUMENTS

| 7,509,506 | B2 | 3/2009 | Bahali et al. |
| 7,607,030 | B2 | 10/2009 | Goodrum et al. |
| 8,397,088 | B1 | 3/2013 | Ghose |
| 2006/0112286 | A1 | 5/2006 | Whalley et al. |
| 2006/0259621 | A1 | 11/2006 | Ranganathan et al. |
| 2007/0124684 | A1 | 5/2007 | Riel et al. |
| 2007/0300083 | A1 | 12/2007 | Goodrum et al. |
| 2009/0259345 | A1 | 10/2009 | Kato et al. |
| 2009/0265568 | A1 | 10/2009 | Jackson |
| 2009/0293022 | A1 | 11/2009 | Fries |
| 2011/0225277 | A1* | 9/2011 | Freimuth et al. ............... 709/223 |

OTHER PUBLICATIONS

Verma et al. pMapper: Method for placing applications in Heterogeneous Virtualized Systems while minimizing power and migration cost.
Moore et al. Making Scheduling Cool: Temperature-Aware Workload Placement in Data Centers. (Usenix 2005).
Pakbaznia et al. Minimizing Data Center Cooling and Server Power Costs. International Symposium on Low Power Electronics and Design, Proceedings of the 14th ACM/IEEE international symposium on Low power electronics and design, San Fancisco, CA, USA, Session: Special session 1: green data centers, pp. 145-150, Year of Publication: 2009, ISBN:978-1-60558-684-7.
IDEAS Relative Performance Estimate(RPE2). http://www.ideasinternational.com/Performance/.

* cited by examiner

Primary Examiner — Bryan Bui
(74) Attorney, Agent, or Firm — Ryan, Mason & Lewis, LLP

(57) ABSTRACT

A system and computer program product for virtual machine placement in a datacenter include using one or more server power characteristics to determine a power cost for any given virtual machine placement in the datacenter, using a heat profile of one or more datacenter components in relation to one or more cooling resources in the datacenter to determine cooling cost for any given virtual machine placement in the datacenter, and using the power cost and cooling cost to apply integrated energy cost minimization at one or more levels of hierarchy in the datacenter to determine placement of a virtual machine in the datacenter such that the integrated energy cost of the datacenter is minimized.

12 Claims, 5 Drawing Sheets

VIRTUAL MACHINE PLACEMENT FOR MINIMIZING TOTAL ENERGY COST IN A DATACENTER

FIELD OF THE INVENTION

Embodiments of the invention generally relate to information technology, and, more particularly, to virtual machine allocation.

BACKGROUND OF THE INVENTION

A large number of datacenters go through one or more types of power-based consolidation/transformation efforts to reduce energy costs. A large fraction of a datacenter's energy cost is from servers. Existing approaches, however, only look at reducing power or reducing cooling costs. Piecemeal solutions at any one level may violate constraints at other levels. For example, satisfying the power budget by consolidating virtual machines (VMs) on a server may violate the cooling capacity at a rack and create hotspots in the datacenter.

Drawbacks exist in considering only power costs. For example, impractical solutions that violate the cooling constraints can lead to damage of equipment by creation of hotspots, inefficient cooling, a high energy bill, etc. Drawbacks also exist in considering only cooling costs, such as, for example, selection of power inefficient servers, a high energy bill, etc. As a result, an integrated solution is needed for capturing different kinds of power and cooling related constraints and objectives that appear in consolidation/transformation endeavors.

SUMMARY OF THE INVENTION

Principles and embodiments of the invention provide techniques for virtual machine (VM) placement in a datacenter. An exemplary method (which may be computer-implemented) for virtual machine placement in a datacenter, according to one aspect of the invention, can include steps of using one or more server power characteristics to determine a power cost for any given virtual machine placement in the datacenter, using a heat profile of one or more datacenter components in relation to one or more cooling resources in the datacenter to determine cooling cost for any given virtual machine placement in the datacenter, and using the power cost and cooling cost to apply integrated energy cost minimization at one or more levels of hierarchy in the datacenter to determine placement of a virtual machine in the datacenter such that the integrated energy cost of the datacenter is minimized.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Principles of the invention include total energy aware virtual machine (VM) placement in a datacenter. One or more embodiments of the invention include minimizing the energy cost in the datacenter due to server power and cooling by intelligently placing VMs on servers.

By way of illustration, air conditioning units (ACUs) in a datacenter are designed to cool air at a particular return temperature (T). Due to a high consolidation ratio on a server, if the return temperature of air flow exceeds T, then equipment can fail due to insufficient cooling, and indiscriminate lowering of an ACU set temperature will incur larger cooling cost. Power aware consolidation without cooling considerations can thus increase cooling costs/risk of equipment failure. Heat interference should be reduced, for example, by taking into account physical location of racks on the datacenter floor, physical location of servers within racks, power efficiency of racks, as well as power efficiency of servers within racks.

Let Q=amount of heat generated, and COP=co-efficient of performance. Then, Cooling Cost=$Q/COP(T\_s)+P\_\{fan\}$, and $COP(T\_s)=c_1 (T\_s)^2+c_2 (T\_s)+c_3$. $T\_s$ increases if $T\_\{max\}$ (that is, the maximum temperature in the area cooled by the CRAC) decreases and vice versa. Also, cooling cost is increased due to, higher heat generation (Q), as well as lower supply temperature ($T\_s$). The operational temperature can be dictated by the temperature of the hottest spot under the control of the cooling unit.

As detailed herein and in contrast to disadvantageous existing approaches, one or more embodiments of the invention include providing integrated power and cooling minimization for VM allocation on servers. Also, the techniques described herein include a hierarchical allocation of units to aggregates (VMs to servers, servers to racks, racks to ACs, etc), as well as inferring a total cost profile as an aggregate of child nodes in a hierarchy.

One or more embodiments of the invention include minimizing the integrated cost of power consumption and cooling in a datacenter by placing VMs such that cost minimization is applied at various levels of hierarchy in the datacenter (that is, individual servers, racks, group of racks, datacenter rooms, etc.). Also, one or more embodiments of the invention can include applying cost minimization by placement of VMs at each level of hierarchy in a datacenter in a recursive manner.

A goal of server consolidation is to create a skew with few highly loaded servers and many idle servers. Additionally, a goal of cooling solutions is to spread the workload around in a uniform manner (for example, so that the heat redistribution is minimized and temperature is equalized). It is desirable to find the right balance between load-equalization and load-skewness. Under periods of low load, one may be able to consolidate on racks cooled by few computer room air conditioner (CRAC) units and switch off the others. During periods of moderate load, it may be better to spread the load on all of the racks. If power-efficient servers are on the same rack, it may not be possible to use all of them if it leads to a large increase in cooling cost.

As detailed herein, multiple levels of the hierarchy are involved, including a datacenter room, rows of racks cooled by a CRAC, racks, and servers. One or more embodiments of the invention include deciding workload placement on servers and racks based on server power characteristics and processing capacity (based on, for example, the type of server), as well as heat profiles of servers/racks/rows of racks/rooms in relation to the cooling resources in the data center.

The techniques described herein use a cost model that captures both cooling and power cost for servers, and this model is extended to capture overall cost for servers, racks, rows of racks, and any higher hierarchy. Further, one or more embodiments of the invention include implementing a top-down decision-making assuming that the decisions at the lower level will be optimal.

Figure 1:
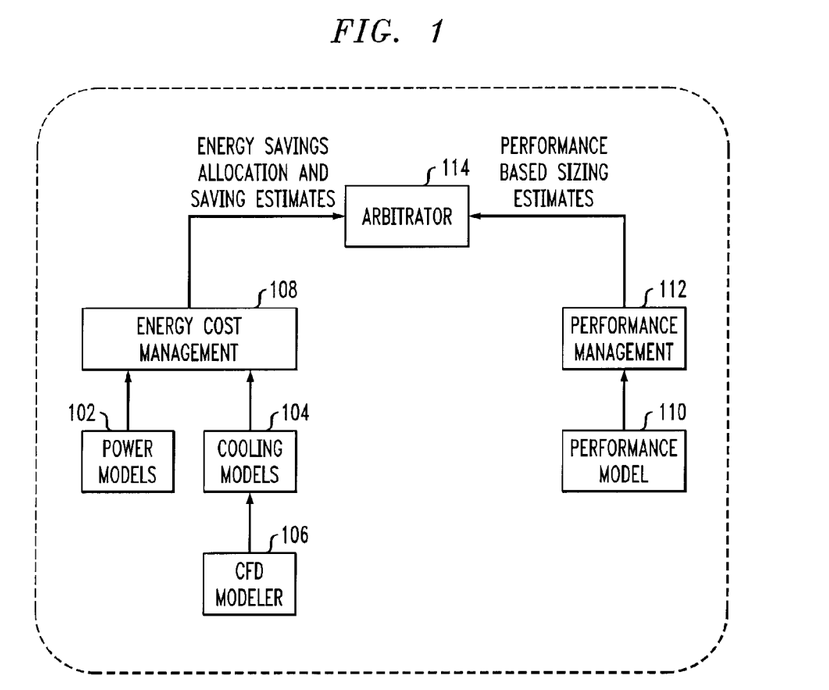
FIG. 1 is a diagram illustrating example system architecture, according to an embodiment of the present invention.

FIG. 1 is a diagram illustrating example system architecture, according to an embodiment of the present invention. By way of illustration, FIG. 1 depicts a power models component 102 and a cooling models component 104, which receives input from a computation fluid dynamics (CFD) modeler component 106. The power models component 102 and cooling models component 104 provide input to an energy cost management component 108. Also, a performance model component 110 provides input to a performance management component 112. Further, the energy cost management component 108 and the performance management component 112 provide input to an arbitrator component 114 in the form of energy savings allocation and savings estimates, and performance based sizing estimates, respectively.

A main task of the arbitrator 114 is to come up with a placement plan that determines which VM is placed on which server and what are the VM sizes in terms of central processing unit (CPU), memory and input/output (I/O) allocations. This decision is based on inputs from the performance management component 112 as well as the energy cost management component 108. The performance management component 112 provides inputs on the desired sizing of the CPU, memory, I/O, etc metrics of the VM depending on the performance that is desired from it. These performance requirements are based on the service level agreements (SLAs) associated with a VM. The performance models 110 of VMs are input to this component. An example of a performance model can include the throughput versus CPU allocation curve of an application.

The performance models 110 are used by the arbitrator 114 to guarantee that desired performance is met. On the other hand, the energy management component 108 provides inputs on the desired sizing of CPU, memory, I/O, etc. metrics of the VM depending on its desired energy efficiency. The power 102 and cooling models 104 are input to this component. An example of a power model can include the power consumed versus CPU allocation curve of a server. An example of a cooling model can include the power generated versus the supply temperature curve. Cooling costs are also determined by temperature distributions in the room, which is highly dependent on the placement of CRAC units in the rows of the datacenter room, direction of air-flow, etc. These are given by a CFD (Computational Fluid Dynamics) modeler tool 106 that drives the creation of the cooling models. Based on these inputs, the arbitrator 114 decides a placement for all VMs on the servers in the datacenter, such that the total energy cost (power and cooling) is minimized while meeting performance objectives.

Figure 2:
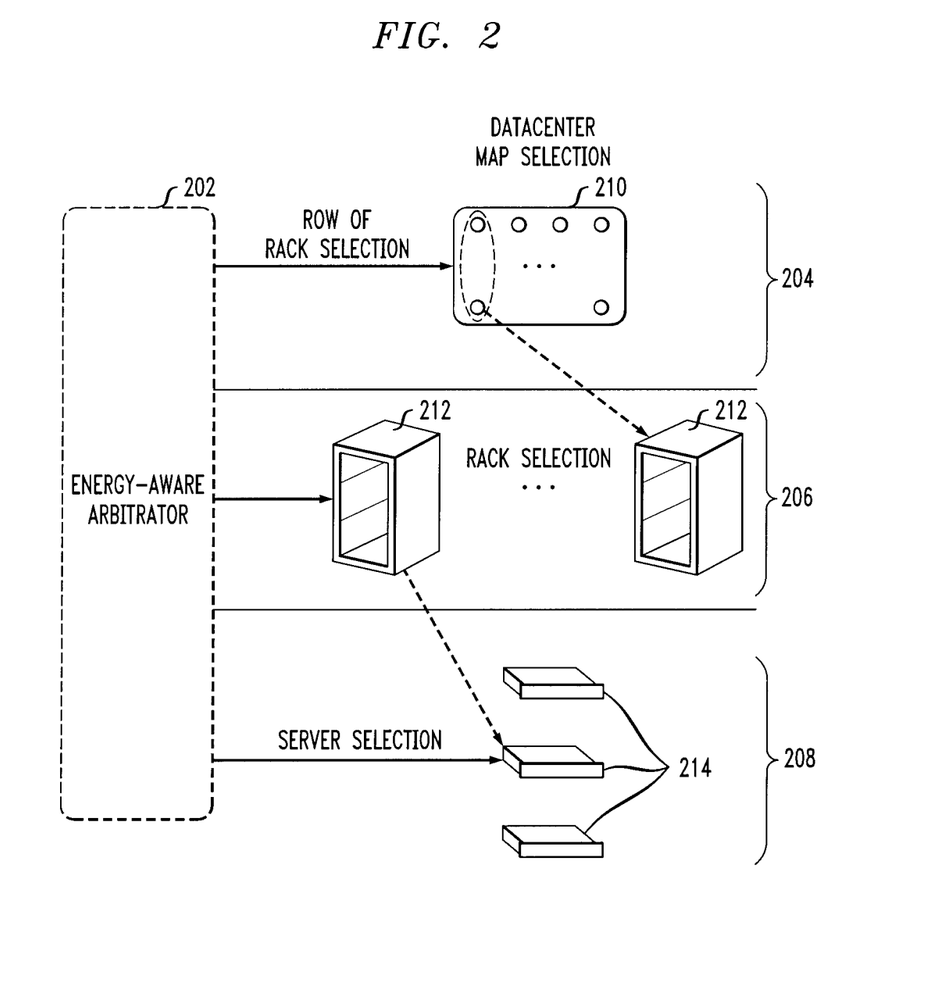
FIG. 2 is a diagram illustrating multiple levels of hierarchy, according to an embodiment of the present invention.

FIG. 2 is a diagram illustrating multiple levels of hierarchy, according to an embodiment of the present invention. By way of illustration, FIG. 2 depicts an energy-aware arbitrator component 202, which provides input in order to perform row of rack selection (step 204), rack 212 selection (step 206) and server 214 selection (step 208). Row of rack selection includes a datacenter map selection 210. In FIG. 2, the arbitrator works through the multiple hierarchy levels (that is, room, rows of racks, racks, server, etc.) in a top-down manner. The arbitrator attempts to find an energy efficient placement for each VM within every level of the hierarchy. It first selects which rows of racks within the datacenter room to place the VM. Then, the arbitrator selects a particular server rack in that row. Finally, it selects a particular server within the rack for hosting the VM. During selection at all levels, the arbitrator attempts to find the placement that gives the minimum energy cost expenditure to the datacenter.

By way of illustration, consider assumptions such as total energy costs are due to the power and the cooling costs, servers on a rack are homogeneous in terms of p or x, and a set of rack rows is cooled by a single CRAC. Also, there can be one common temperature setting of the CRAC unit, and cooling cost can be determined by the energy needed to cool the recycled air to T degrees. T is determined by the supply temperature, the maximum safe server inlet temperature and the maximum observed server inlet temperature. Further, a room can have multiple CRACs, and a datacenter can have multiple rooms. Temperature of exit air at a server rack can be proportional to the total power generated in the rack. Additionally, in one or more embodiments of the invention, datacenter layout is known, and a fixed volume of air is recirculated.

The techniques described herein can include inputs such as a cooling model, server types, server layout in a rack, and rack layout cooled by a CRAC unit. With respect to cooling models, for a given power generation distribution, the temperature distribution and the required plenum temperature are predicted. A cooling model can also include the cooling cost for a given plenum temperature (for example, from the data sheet of the CRAC unit). Server types input can include, for example, for each server $s\_j$, its power cost $p\_j$ versus load $l\_j$. With respect to server layout in a rack, for each rack, one or more embodiments of the invention include defining a set $r\_k$ of the servers hosted.

With rack layout cooled by a CRAC unit, for each level in the hierarchy, one or more embodiments of the invention include defining a set $h\_l$ of the elements in the lower hierarchy. Additionally, for each level in the hierarchy, an aggregation function that relates the cooling cost can be provided as an input as well. Also, one or more embodiments of the invention can include an input of, for each workload, its requirement $c\_i$.

The techniques detailed herein include allocating the workloads in a datacenter so as to minimize the total energy cost. For each workload, one or more embodiments of the invention include identifying $x\_\{i,j\}$ such that $x\_\{i,j\}=1$ if workload i is placed on server s_j. Also, one or more embodiments of the invention include minimizing Σ(P+F), where P represents the total power cost and F represents the total cooling cost in the datacenter. P is a function of the power efficiency of all of the servers Σs_j, and F is a function of the heat generated in the datacenter, cooling efficiency of equipment and fan speed.

Additionally, one or more embodiments of the invention include using constraints such as:

(i) Every server should be packed within its capacity, $$\sum_{i=1}^{N} x_{i,j} c_i \in C_j, \forall j = 1 \ldots M$$

(ii) All of the VMs should be packed on some server, $$\sum_{j=1}^{M} x_{i,} = 1, \forall i = 1 \ldots N$$

where cj is the capacity required by a VM and is the limit on server resource usage due to capacity and cooling systems.

Figure 3:
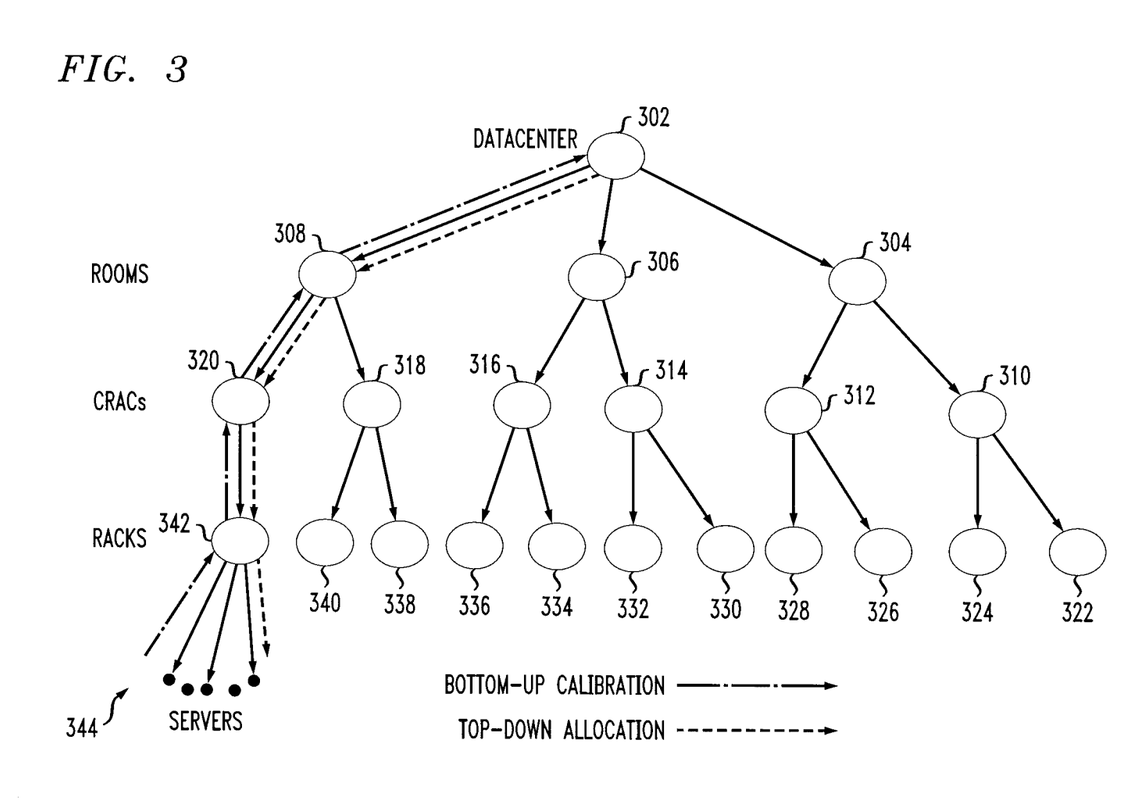
FIG. 3 is a diagram illustrating how the techniques detailed herein work across multiple levels of hierarchy, according to an embodiment of the present invention.

FIG. 3 is a diagram illustrating how the techniques detailed herein work across multiple levels of hierarchy, according to an embodiment of the present invention. The methodology includes (i) a one-time calibration step during which cost models for each tier in the hierarchy are built, and (ii) a placement step which is used to place virtual machines on servers. FIG. 3 illustrates that the calibration step is performed in a bottom-up manner, while the actual placement of a VM is performed top-down. By way of illustration, FIG. 3 depicts a datacenter 302, which provides input to rooms 304, 306 and 308, which provide input to CRACs 310, 312, 314, 316, 318 and 320, which provide input to racks 322, 324, 326, 328, 330, 332, 334, 336, 340 and 342, which provides input to servers 344. FIG. 3 also depicts bottom-up calibration from servers 344 to rack 342 to CRAC 320 to room 308 to datacenter 302. Additionally, FIG. 3 depicts top-down allocation from datacenter 302 to room 308 to CRAC 320 to rack 342 to servers 344.

During the bottom-up calibration step, measurements are performed at each level of the hierarchy. At the server level, for a representative server, the power consumed for different sizes of workload is measured. At the rack level, based on the servers on the rack, one or more embodiments of the invention estimate the energy consumed in order to service a certain workload. The same measurement is repeated at each level of the hierarchy.

As described herein, one or more embodiments of the invention can include recursive calibration. The recursive calibration works by simulating the placement of multiple unit sized workloads (one unit equals capacity of one server) on a hierarchy level. For an element E in the level L, the recursive calibration assumes that the lower level L−1 has already been calibrated. Using the calibration of lower level and an aggregation function based on CFD models, one or more embodiments of the invention estimate for every unit of placement (i) the best location for the workload in the lower level L−1 and (ii) the corresponding power and cooling costs at the higher level L. This calibration is then used to estimate the total energy cost per unit of workload allocated to this element E. Once there is a model for all elements at level L, one or more embodiments of the invention recursively build the calibration model for level L+1. Note that the techniques detailed herein capture (i) the total energy cost for allocating a given amount of workload to each element and (ii) the optimal distribution of workloads to elements in the lower hierarchy.

In a base step of recursive calibration, for each rack, the most power-efficient server identified and the cooling cost for loading it is computed. The cooling cost and power cost are added to compute the energy cost for the energy cost of the server, and temperature and cost curves can be created with this server. While there are additional servers in the rack, one or more embodiments of the invention can include identifying the next server to pack any more workload (one can try all possible options) such that the additional energy cost is minimized. Such a server can be used, for example, to create the next part of the curve.

In an inductive step of recursive calibration, for any level in the hierarchy containing M_1 elements with total capacity C, the placement of unit workload on each element is simulated, and an aggregation function is used to compute the overall temperature in the unit. Additionally, one or more embodiments of the invention include computing the overall cost, selecting the element with the least overall cost and using it to compute the curves for this level, and breaking when all C units are placed.

Figure 4:
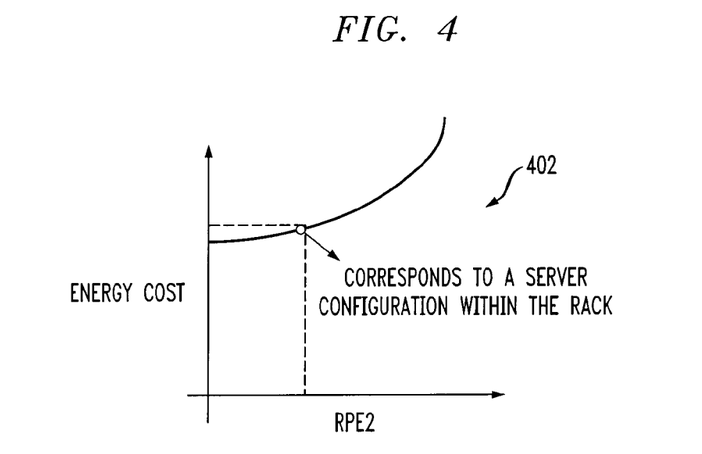
FIG. 4 is a graph illustrating rack models, according to an embodiment of the present invention.

FIG. 4 is a graph 402 illustrating rack models, according to an embodiment of the present invention. One or more embodiments of the invention include using the IDEAS RPE2 metric to capture the capacity of a server or the resource required by a VM. The RPE2 metric from IDEAS is a metric for benchmarking servers that accounts for heterogeneity in processor architectures. FIG. 4 depicts RPE2 versus cost, wherein cost=F(capacity) and the nature of F includes monotonically increasing with RPE2 and the maximum supported RPE2 is limited by the cooling systems.

As detailed herein, all models include power cost and cooling cost. In one or more embodiments of the invention, with respect to a power cost, a second derivative of power cost with RPE2 is >0. Cooling cost can be, for example, directly proportional to heat (that is, directly proportional to power cost). For instance, a second derivative of heat with RPE2 is >0. Also, cooling cost is inversely proportional to COP or $T\_s^2$, T_s increases if T_{max} decreases, and it can be shown that the second derivative of cooling cost with T_{max} is >0. Also, T_{max} is directly proportional to heat generated (assuming no leakage).

In one or more embodiments of the invention, cooling cost=f_H(RPE2) f_T(c*f_H(RPE2)), where f_H(RPE2) relates RPE2 to heat and f_T relates 1/COP to heat. Because both f_H and f_T have a second derivative greater than 0, cooling cost has a second derivative>0. Also, in one or more embodiments of the invention, energy cost=power cost+cooling cost has a second derivative>0 ➔ Local search leads to global optimal.

Figure 5:
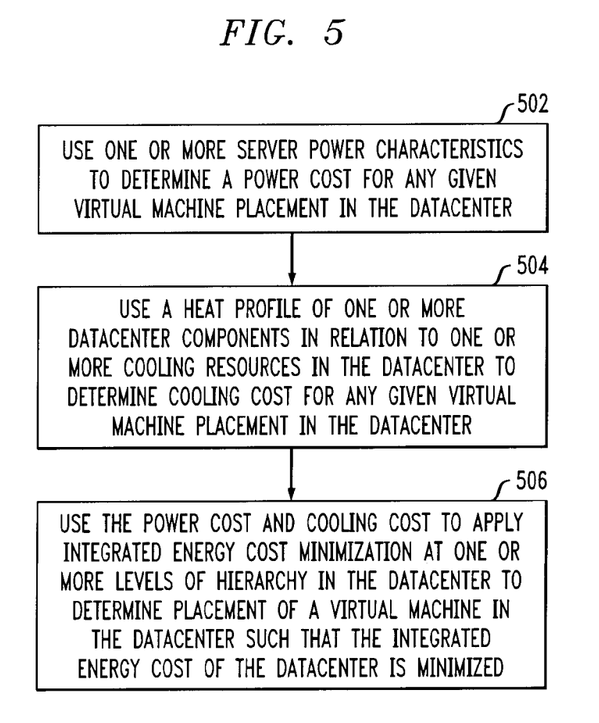
FIG. 5 is a flow diagram illustrating techniques for virtual machine placement in a datacenter, according to an embodiment of the invention.

FIG. 5 is a flow diagram illustrating techniques for virtual machine placement in a datacenter, according to an embodiment of the present invention. Step 502 includes using one or more server power characteristics (for example, processing capacity of the server) to determine a power cost for any given virtual machine placement in the datacenter. Step 504 includes using a heat profile of one or more datacenter components (for example, a server, a rack, a row of racks and/or a datacenter room) in relation to one or more cooling resources in the datacenter to determine cooling cost for any given virtual machine placement in the datacenter.

Step 506 includes using the power cost and cooling cost to apply integrated energy cost minimization at one or more levels of hierarchy in the datacenter (for example, individual servers, a rack, a group of racks, and/or datacenter rooms) to determine placement of a virtual machine in the datacenter such that the integrated energy cost of the datacenter is minimized. The integrated energy cost minimization aims at reducing the power cost due to a server load and the cooling cost due to the heat generated from the equipment.

The integrated energy cost equals the sum of the power cost and the cooling cost. Also, the power cost can be given by a power consumed versus capacity curve for a server. In one or more embodiments of the invention, a power consumed versus capacity curve is built using actual measurements during a calibration phase and/or server specifications. Cooling cost of can be determined by a temperature versus capacity curve for each of the one or more datacenter components. In one or more embodiments of the invention, a temperature versus capacity curve is built for all components of the datacenter during a calibration phase using a computation fluid dynamics modeling tool that uses computation fluid dynamics to calculate temperature of a datacenter component due to heat generated by equipment, datacenter layout and air flow mechanisms. By way of example, a higher set temperature of the CRAC can indicate higher cooling performance and lower cooling cost (volume of air circulating remaining fixed).

Further, applying integrated energy cost minimization at one or more levels of hierarchy in the datacenter can include calibrating in a bottom-up manner by creating a function of the energy cost and temperature per unit of workload allocated at each level in the hierarchy, as well as implementing a top-down workload placement decision-making function, assuming that one or more decisions at a lower level will be optimal.

Calibrating in a bottom-up manner can include calibrating at a level L using a calibration at a lower level L-1 and an aggregation function that captures an impact of interference between elements at the level L-1. Also, the calibration at level L for a total workload capacity C can be built using a placement on level L-1 that minimizes total energy cost at level L-1 and aggregation cost (where the aggregation cost may be provided by a CFD modeler). Additionally, the top-down workload placement can use the bottom-up calibration to identify an optimal element at a lower level L-1 to place a workload.

The techniques depicted in FIG. 5 can also, as described herein, include providing a system, wherein the system includes distinct software modules, each of the distinct software modules being embodied on a tangible computer-readable recordable storage medium. The distinct software modules can include, for example, a power model module, a cooling model module, a computation fluid dynamics modeler module, a performance model module, a performance management module, an energy cost management module, an energy-aware arbitrator module and an arbitrator module executing on a hardware processor.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
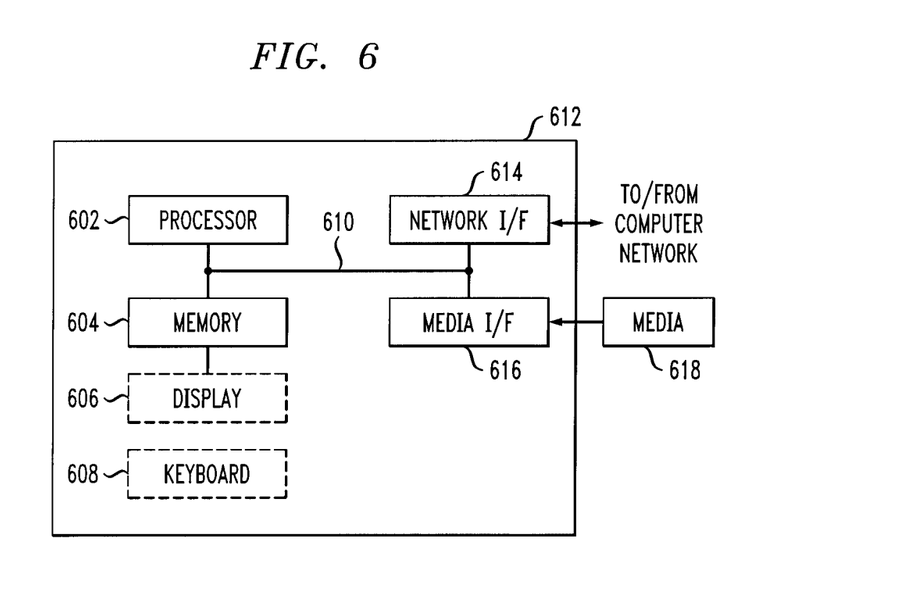
FIG. 6 is a system diagram of an exemplary computer system on which at least one embodiment of the invention can be implemented.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like)

can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1 and FIG. 2. The method steps can then be carried out using the distinct software modules and/or sub-modules of the system, as described above, executing on one or more hardware processors 602. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing integrated power and cooling minimization for VM allocation on servers.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A computer program product comprising a tangible computer readable recordable storage medium including computer useable program code for virtual machine placement in a datacenter, the computer program product including:
    computer useable program code for using one or more server power characteristics to determine a power cost for any given virtual machine placement in the datacenter;
    computer useable program code for using a heat profile of one or more datacenter components in relation to one or more cooling resources in the datacenter to determine cooling cost for any given virtual machine placement in the datacenter; and
    computer useable program code for using the power cost and cooling cost to apply integrated energy cost minimization at one or more levels of hierarchy in the datacenter to determine placement of a virtual machine in the datacenter such that the integrated energy cost of the datacenter is minimized via:
        calibrating in a bottom-up manner by creating a function of energy cost and temperature per unit of workload allocated at each level in the hierarchy; and
        implementing a top-down workload placement decision-making function.

2. The computer program product of claim 1, wherein the one or more levels of hierarchy in the datacenter comprise at least one of one or more individual servers, a rack, a group of one or more racks, and one or more datacenter rooms.

3. The computer program product of claim 1, wherein the one or more server power characteristics comprise processing capacity of the server.

4. The computer program product of claim 1, wherein the integrated energy cost equals the sum of the power cost and the cooling cost.

5. The computer program product of claim 1, wherein the power cost is given by a power consumed versus capacity curve for a server.

6. The computer program product of claim 1, wherein the cooling cost of is determined by a temperature versus capacity curve for each of the one or more datacenter components.

7. A system for virtual machine placement in a datacenter, comprising:
    a memory; and
    at least one processor coupled to the memory and operative to:
        use one or more server power characteristics to determine a power cost for any given virtual machine placement in the datacenter;
        use a heat profile of one or more datacenter components in relation to one or more cooling resources in the datacenter to determine cooling cost for any given virtual machine placement in the datacenter; and
        use the power cost and cooling cost to apply integrated energy cost minimization at one or more levels of hierarchy in the datacenter to determine placement of a virtual machine in the datacenter such that the integrated energy cost of the datacenter is minimized via:
            calibrating in a bottom-up manner by creating a function of energy cost and temperature per unit of workload allocated at each level in the hierarchy; and
            implementing a top-down workload placement decision-making function.

8. The system of claim 7, wherein the one or more levels of hierarchy in the datacenter comprise at least one of one or more individual servers, a rack, a group of one or more racks, and one or more datacenter rooms.

9. The system of claim 7, wherein the one or more server power characteristics comprise processing capacity of the server.

10. The system of claim 7, wherein the integrated energy cost equals the sum of the power cost and the cooling cost.

11. The system of claim 7, wherein the power cost is given by a power consumed versus capacity curve for a server.

12. The system of claim 7, wherein the cooling cost of is determined by a temperature versus capacity curve for each of the one or more datacenter components.

* * * * *